United States Patent [19]

Gierloff

[11] Patent Number: 5,014,792
[45] Date of Patent: May 14, 1991

[54] GARDEN GLOVE TOOL

[76] Inventor: Christian S. Gierloff, 187 Penzance Rd. P.O. Box 426, WoodsHole, Mass. 02543

[21] Appl. No.: 504,406

[22] Filed: Apr. 4, 1990

[51] Int. Cl.$^5$ .................. A01B 01/00; A01B 01/06; A01B 01/22
[52] U.S. Cl. .................. 172/371; 2/161 R; 172/378; 172/250
[58] Field of Search .......... 172/370, 371, 378, 245, 172/250, 253; 294/25, 131, 1.3; 2/160, 161 R, 167, 17, 16

[56] References Cited

U.S. PATENT DOCUMENTS

| 883,761 | 4/1908 | Taylor et al. | 294/25 |
| 1,387,728 | 8/1921 | Kramer | 2/161 R X |
| 2,954,832 | 10/1960 | Pirone | 172/370 |
| 4,149,601 | 4/1979 | Taylor | 172/370 |

FOREIGN PATENT DOCUMENTS 93815 2/1959 Norway .................. 2/16

Primary Examiner—Dennis L. Taylor
Assistant Examiner—Spencer Warnick
Attorney, Agent, or Firm—Leon Gilden

[57] ABSTRACT

A garden tool configured as a glove includes a rigid "J" shaped body terminating in a continuous forward edge spaced from an entrance opening, wherein the entrance opening includes a flexible surrounding skirt mounted to the rigid opening. The interior surface of the glove defining the concave bottom surface is of an undulating configuration to accommodate fingers of a hand positioned therewithin. The glove includes modifications, wherein the glove terminates in a forward blunt surface receiving a spike thereon. Further, the invention utilizes a glove mounting a spike spaced from the forward continuous edge, and wherein the spike optionally may include a replaceable spike mounting spaced rearwardly extending cutting blades for cutting roots and the like in use.

4 Claims, 4 Drawing Sheets

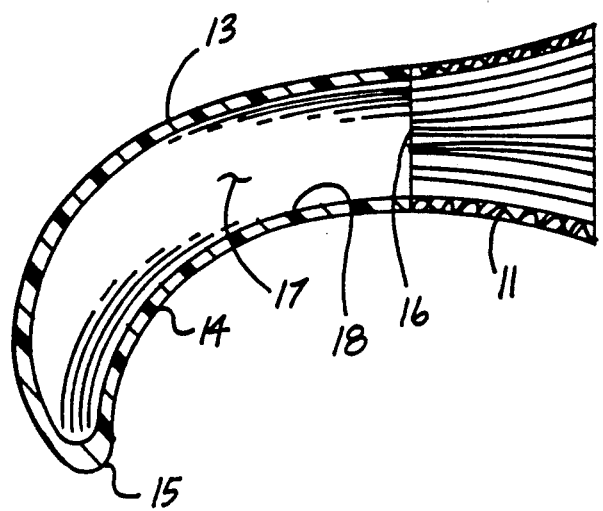
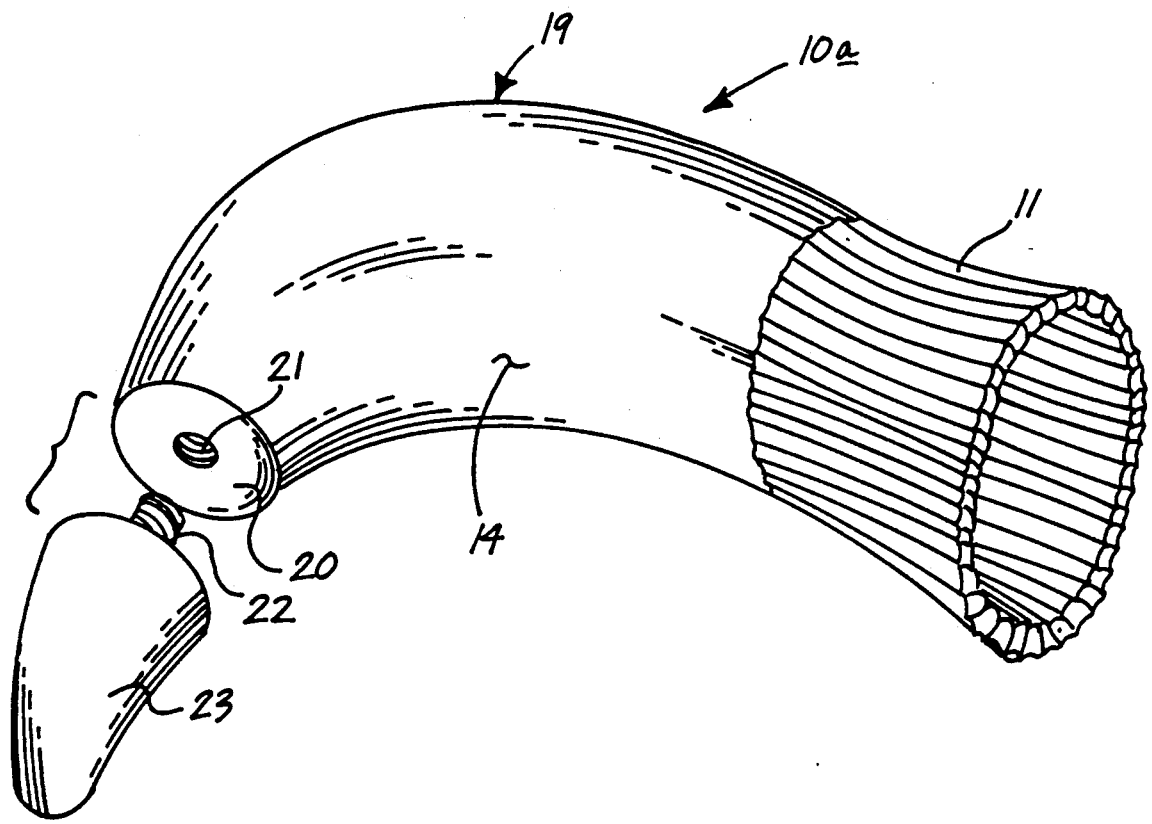

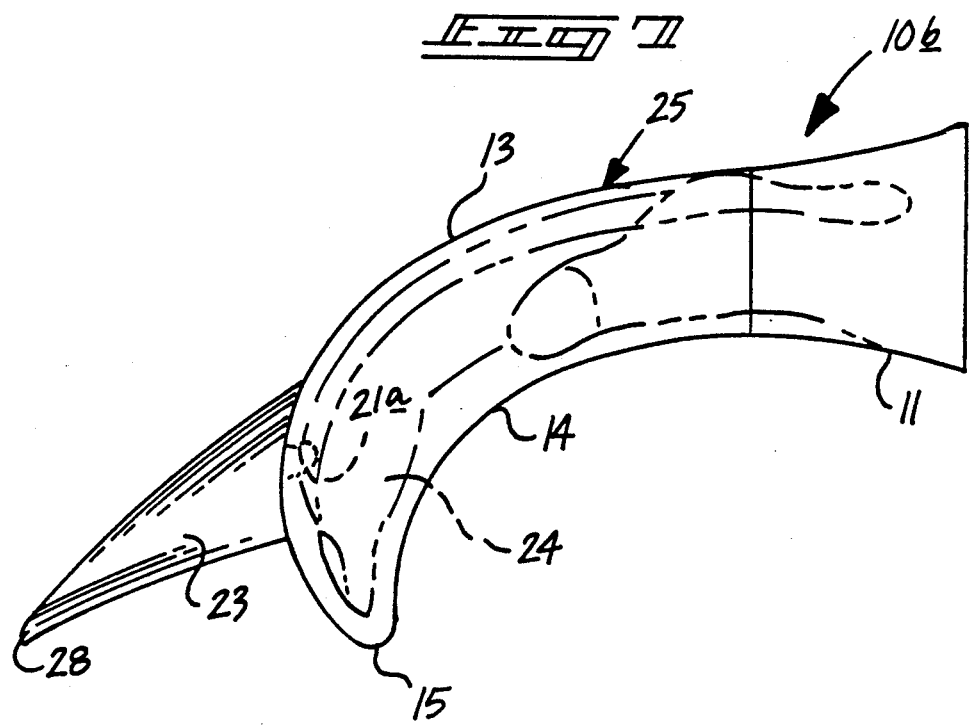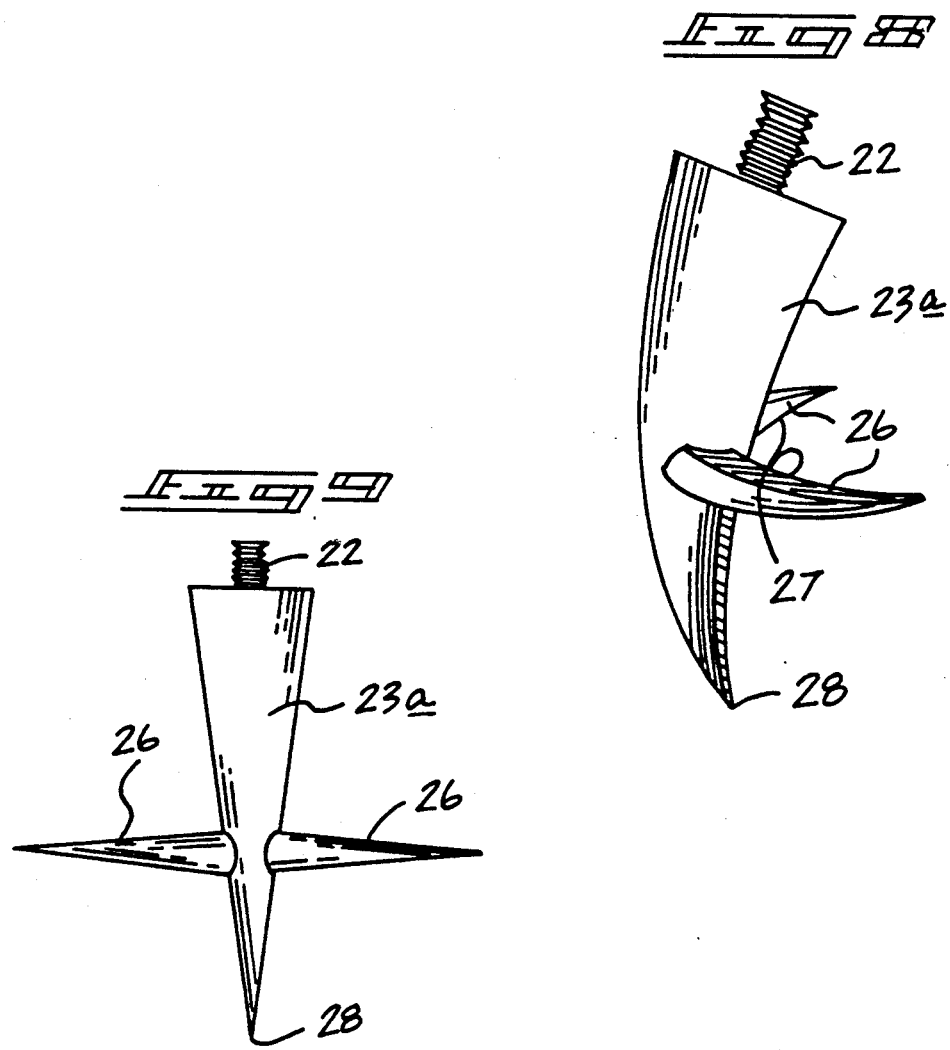

GARDEN GLOVE TOOL

BACKGROUND OF THE INVENTION

1. Field of the Invention

The field of invention relates to garden tools, and more particularly pertains to a new and improved garden glove tool wherein the same protects a user's hand while providing a rigid type glove tool to effect digging and scratching during performance of a garden task.

2. Description of the Prior Art

In gardening, protection of the hand from various obstructions within soil conditions is desired, as well as protecting an individual's hand from association with various garden chemicals and the like. Tools in the prior art have been utilized to provide digging, scratching, etc., within a garden, and wherein the present invention attempts to overcome deficiencies of the prior art by providing a rigid glove-like shell receiving an individual's hand therewithin to effect such digging. Examples of the prior art include U.S. Pat. No. 4,089,379 to Crownover wherein a glove of a flexible construction includes a tool directed exteriorly of the glove, with a rear end directed interiorly of a cavity of the glove to permit securement of tools therewithin.

U.S. Pat. No. 4,683,592 to Strongwater sets forth an ice scraping mitt, wherein the mitt includes a scraping blade directed exteriorly of the glove of a rigid construction, as opposed to the glove shape.

U.S. Pat. No. 1,330,406 to Stricklin sets forth a hand guard wherein various eating implements are mounted within the guard and extending forwardly thereof.

U.S. Pat. No. 2,436,507 to Ellwood sets forth a cooking utensil tool mounting a rearwardly extending shield positioned about the handle of the tool.

U.S. Pat. No. 4,203,495 to Crownover sets forth a further gardening tool, wherein a flexible mitt mounts forwardly thereof a selective number of garden tools.

As such, it may be appreciated that there continues to be a need for a new and improved garden glove tool wherein the same addresses both the problems of ease of use, as well as effectiveness in construction and in this respect, the present invention substantially fulfills this need.

SUMMARY OF THE INVENTION

In view of the foregoing disadvantages inherent in the known types of garden tools now present in the prior art, the present invention provides a garden glove tool wherein the same permits insertion of an individual's hand within a rigid "J" shaped protective glove body, and wherein the glove body is defined by a forward continuous edge to permit use of the glove body as a digging and scratching implement. As such, the general purpose of the present invention, which will be described subsequently in greater detail, is to provide a new and improved garden glove tool which has all the advantages of the prior art garden tools and none of the disadvantages.

To attain this, the present invention includes a garden tool configured as a glove wherein a rigid "J" shaped body terminates in a continuous forward edge spaced from an entrance opening, wherein the entrance opening includes a flexible surrounding skirt mounted to the rigid opening. The interior surface of the glove defining the concave bottom surface is of an undulating configuration to accommodate fingers of a hand positioned therewithin. The glove includes modifications, wherein the glove terminates in a forward blunt surface receiving a spike thereon. Further, the invention utilizes a glove mounting a spike spaced from the forward continuous edge, and wherein the spike optionally may include a replaceable spike mounting spaced rearwardly extending cutting blades for cutting roots and the like in use.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved garden glove tool which has all the advantages of the prior art garden tools and none of the disadvantages.

It is another object of the present invention to provide a new and improved garden glove tool which may be easily and efficiently manufactured and marketed.

It is a further object of the present invention to provide a new and improved garden glove tool which is of a durable and reliable construction.

An even further object of the present invention is to provide a new and improved garden glove tool which is susceptible of a low cost of manufacture with regard to both materials and labor, and which accordingly is then susceptible of low prices of sale to the consuming public, thereby making such garden glove tools economically available to the buying public.

Still yet another object of the present invention is to provide a new and improved garden glove tool which provides in the apparatuses and methods of the prior art some of the advantages thereof, while simultaneously overcoming some of the disadvantages normally associated therewith.

Still another object of the present invention is to provide a new and improved garden glove tool wherein the same provides a rigid protective shell about an individual's hand permitting the individual to effect various digging operations within a garden.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is an orthographic cross-sectional view, taken along the lines 5—5 of FIG. 4, in the direction indicated by the arrows.

FIG. 6 is an isometric illustration of a modified garden glove tool of the instant invention.

FIG. 7 is an orthographic side view of a further modified garden glove tool of the instant invention.

FIG. 8 is an orthographic side view of a modified spike utilized by the tool, as illustrated in FIGS. 6 and 7.

FIG. 9 is an orthographic top view of the modified spike, as illustrated in FIG. 8.

DESCRIPTION OF THE PREFERRED EMBODIMENT

Figure 1:
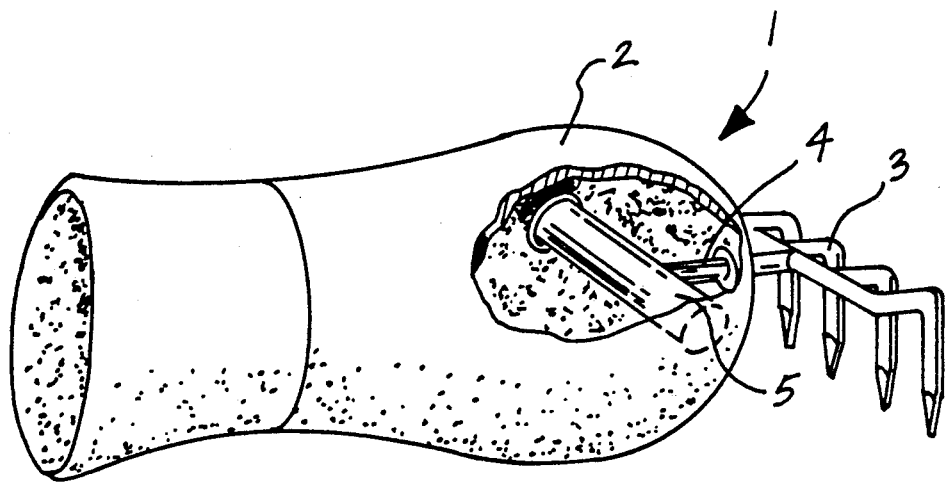
FIG. 1 is an isometric illustration of a prior art garden glove tool.

With reference now to the drawings, and in particular to FIGS. 1 to 9 thereof, a new and improved garden glove tool embodying the principles and concepts of the present invention and generally designated by the reference numerals 10, 10a, and 10b will be described.

Figure 2:
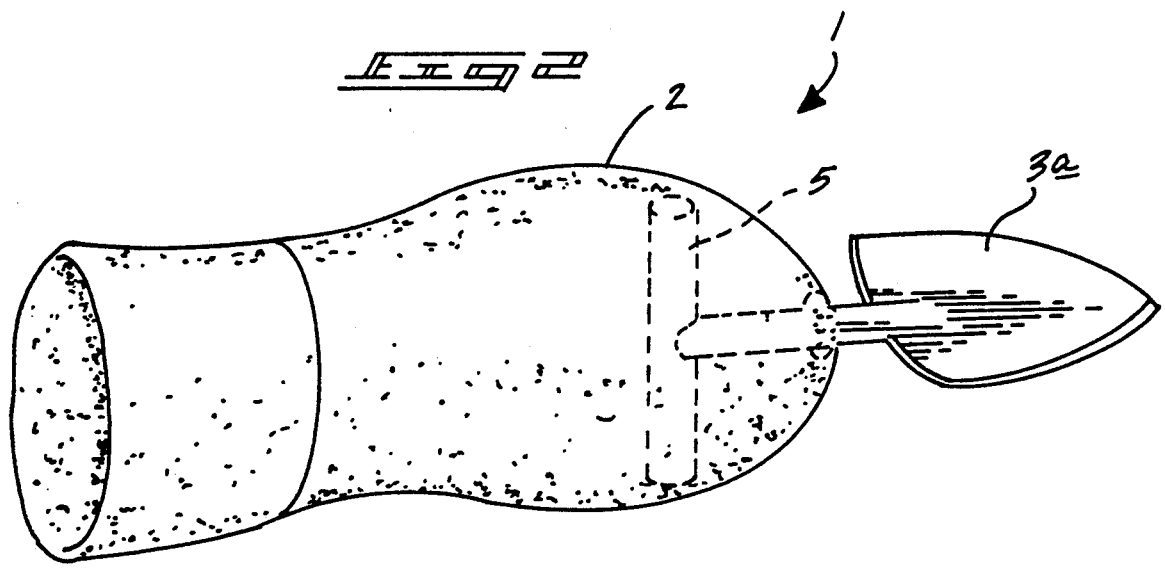
FIG. 2 is an isometric illustration of the garden glove tool of FIG. 1 mounting a further garden implement.
Figure 3:
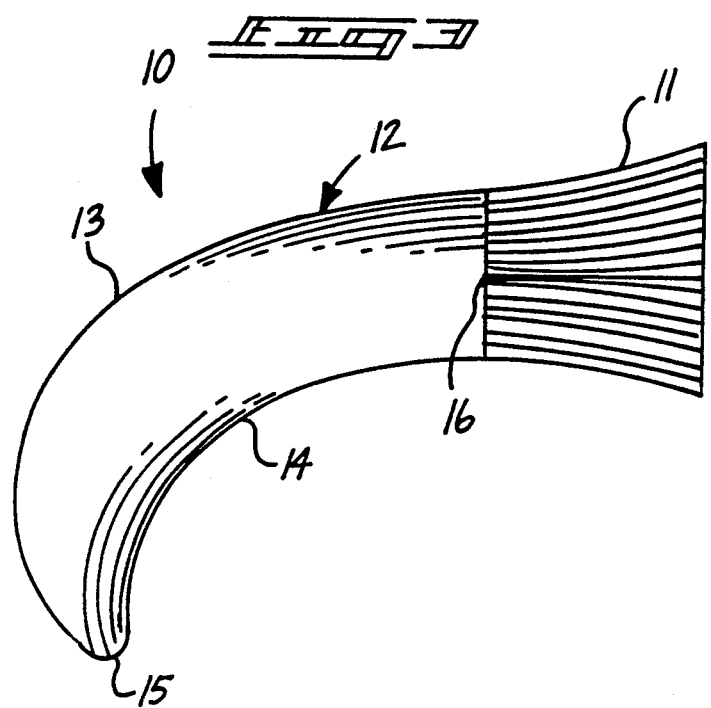
FIG. 3 is an orthographic side view of the instant invention.
Figure 4:
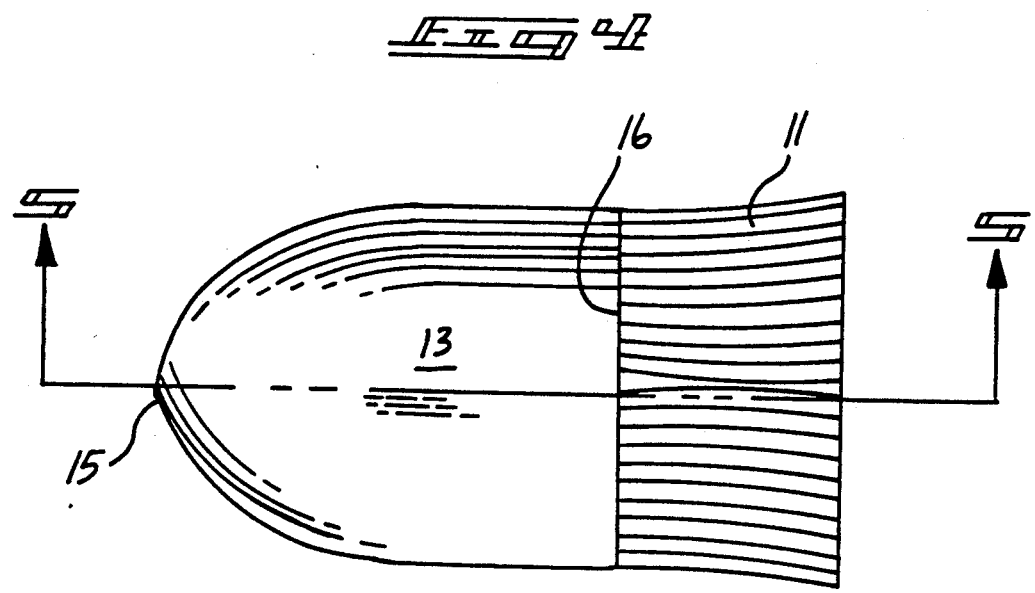
FIG. 4 is an orthographic top view of the instant invention.

FIG. 1 illustrates a prior art garden glove tool 1 including a mitt member 2, including a tool 3 directed exteriorly of the mitt through an interiorly directed shank 4 integrally mounted to an interior handle 5. The tool, as illustrated in FIG. 2, includes a further tool implement 3a mounted on an associated shank.

More specifically, the garden glove tool 10 of the instant invention essentially comprises a rigid body 12 defined by a generally "J" shaped configuration terminating in a continuous convex forward edge 15. The body 12 includes a convex top surface 13 spaced above a convex bottom surface 14. The rigid body 12 includes a rigid rear entry opening 16 directed into a central cavity 17 (see FIG. 5), with a flexible truncated conical entry skirt 11 directed rearwardly and coextensively of the body 12. The concave bottom surface 14 includes an undulating interior surface 18 to enhance positioning of an individual's hand 24 directed within the cavity 17.

FIG. 6 illustrates a modified tool 10a, including a modified "J" shaped body 19 terminating in a forward blunt nose 20. The blunt nose 20 includes a threaded bore 21 to receive a threaded shank 22 therewithin. The threaded shank is integrally and coaxially formed to an arcuate rigid spike 23 terminating in a forward point 28.

FIG. 7 illustrates a further modified tool 10b wherein the rigid spike 23 is mounted onto the convex top surface 13 spaced above the continuous convex forward edge 15. The "J" shaped rigid body 25 further permits mounting of a modified spike 23a, wherein the modified spike 23a includes a plurality of arcuate cutting blades 26 mounted to each side of the spike rearwardly of the forward point 28. The cutting blades 26 include arcuate rearwardly extending cutting edges 27 to permit cutting of roots and stems during a garden cultivating and preparation. In this manner, selective use of various spikes 23 or 23a may be utilized, dependent upon requirements of an individual.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A garden glove tool for receiving a hand, and fixing the hand in a generally "J" shaped configuration, wherein the tool comprises,
    an elongate "J" shaped rigid body, the body including a forward downwardly extending convex surface defining a concave bottom surface underlying a coextensively arranged convex top surface, the top surface and the bottom surface extending rearwardly and defining a rigid entrance opening, and
    a flexible skirt mounted coextensively to the entrance opening and rearwardly thereof, and
    wherein the skirt defines a truncated conical configuration and is formed of a flexible and resilient fabric to enclose the hand within the body, and
    wherein the convex top surface includes a threaded bore, the threaded bore receiving a threaded shank complementarily therewithin, and the threaded shank mounting an arcuate spike member thereon, the arcuate spike member terminating in a forwardly directed point.

2. A tool as set forth in claim 1 wherein the spike member is of a rigid construction and is mounted to the convex top surface spaced above and adjacent the forwardly directed point.

3. A tool as set forth in claim 2 wherein the spike member includes a plurality of blades integrally and orthogonally mounted to opposed sides of the spike member and directed rearwardly thereof.

4. A tool as set forth in claim 3 wherein each of the blades includes an arcuate cutting edge, and the blades are aligned relative to one another on opposed sides of the spike member.

* * * * *